US012193895B2

(12) United States Patent
Schneider et al.

(10) Patent No.: US 12,193,895 B2
(45) Date of Patent: Jan. 14, 2025

(54) DENTAL MACHINING SYSTEM FOR PREDICTING THE WEAR CONDITION OF A DENTAL TOOL

(71) Applicants: DENTSPLY SIRONA Inc., York, PA (US); SIRONA DENTAL SYSTEMS GMBH, Bensheim (DE)

(72) Inventors: Hans-Christian Schneider, Einhausen (DE); Sebastian Steger, Heddesheim (DE); Daniel Weiss, Heddesheim (DE)

(73) Assignee: Dentsply Sirona Inc., York, PA (US)

( * ) Notice: Subject to any disclaimer, the term of this patent is extended or adjusted under 35 U.S.C. 154(b) by 449 days.

(21) Appl. No.: 17/770,361

(22) PCT Filed: Oct. 16, 2020

(86) PCT No.: PCT/EP2020/079200
§ 371 (c)(1),
(2) Date: Apr. 20, 2022

(87) PCT Pub. No.: WO2021/083693
PCT Pub. Date: May 6, 2021

(65) Prior Publication Data
US 2022/0378560 A1  Dec. 1, 2022

(30) Foreign Application Priority Data

Nov. 1, 2019 (EP) ..................... 19206733

(51) Int. Cl.
*A61C 13/00* (2006.01)
*A61C 1/00* (2006.01)
(Continued)

(52) U.S. Cl.
CPC ........ *A61C 13/0004* (2013.01); *A61C 1/0007* (2013.01); *A61C 1/02* (2013.01);
(Continued)

(58) Field of Classification Search
None
See application file for complete search history.

(56) References Cited

U.S. PATENT DOCUMENTS

2005/0154488 A1*  7/2005  Esterling ............ G05B 19/4065
                                                  700/175
2007/0243503 A1   10/2007  Gagnon
(Continued)

FOREIGN PATENT DOCUMENTS

CN        101770222 A      7/2010
CN        102091972 A      6/2011
(Continued)

OTHER PUBLICATIONS

International Search Report; PCT/EP2020/079200; Dec. 23, 2020 (completed); Jan. 18, 2021 (mailed).
(Continued)

*Primary Examiner* — Paul B Yanchus, III
(74) *Attorney, Agent, or Firm* — SCHWEGMAN LUNDBERG & WOESSNER, P.A.

(57) ABSTRACT

A dental machining system for manufacturing a dental restoration including: a dental tool machine (1) which has: a dental blank holder for holding at least one dental blank (2) relatively movably with respect to one or more dental tools (3); one or more driving units (4) each for movably holding at least one dental tool (3) for machining the dental blank (2), a control unit for controlling the dental blank holder and the driving units (4) based at least on a temporal trajectory of the dental tool (3) relative to the dental blank (2) and a spatial amount of material removal from the dental blank (2) along the temporal trajectory. The control unit executes a trained artificial intelligence algorithm.

14 Claims, 2 Drawing Sheets

Figure 1:
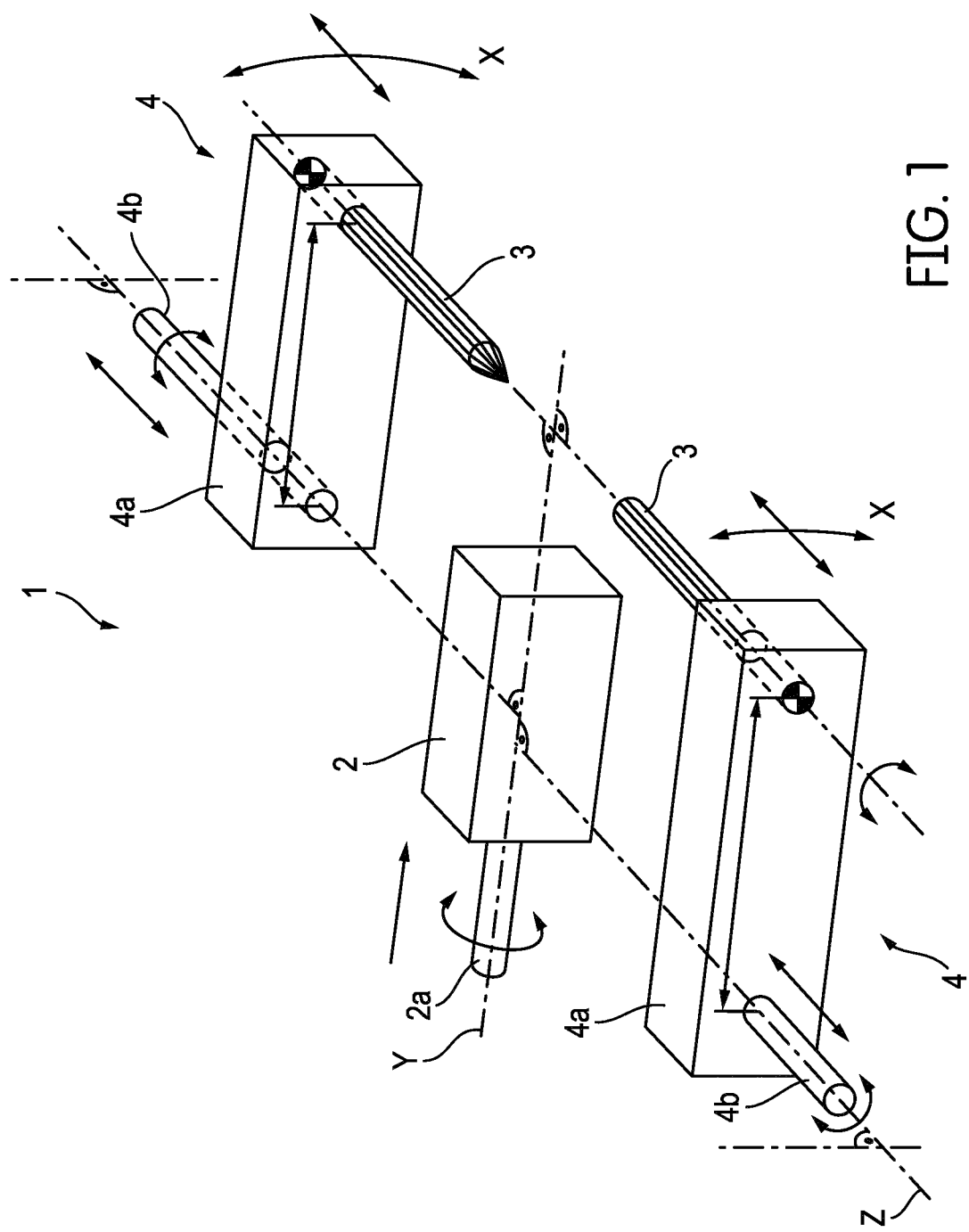

(51) Int. Cl.
*A61C 1/02* (2006.01)
*A61C 13/083* (2006.01)
*G05B 19/4065* (2006.01)
*G06F 30/27* (2020.01)

(52) U.S. Cl.
CPC ........ *A61C 13/0006* (2013.01); *A61C 13/083* (2013.01); *G05B 19/4065* (2013.01); *G06F 30/27* (2020.01); *G05B 2219/37252* (2013.01)

(56) References Cited

U.S. PATENT DOCUMENTS

| | | |
|---|---|---|
| 2008/0254404 A1 | 10/2008 | Heraud |
| 2018/0275630 A1 | 9/2018 | Kao |
| 2019/0258222 A1 | 8/2019 | Karandikar |

FOREIGN PATENT DOCUMENTS

| | | |
|---|---|---|
| CN | 102179728 A | 9/2011 |
| CN | 103465107 A | 12/2013 |
| CN | 106217128 A | 12/2016 |
| CN | 108107838 A | 6/2018 |
| CN | 109822399 A | 5/2019 |
| EP | 3372338 A1 | 9/2018 |
| JP | 2017064190 A | 4/2017 |
| JP | 2019139755 A | 8/2019 |
| KR | 20190000815 A | 1/2019 |

OTHER PUBLICATIONS

International Preliminary Report on Patentability; PCT/EP2020/079200; Dec. 23, 2020 (completed); Jan. 18, 2021 (mailed).
Written Opinion of the International Searching Authority; PCT/EP2020/079200; Dec. 23, 2020 (completed); Jan. 18, 2021 (mailed).
Lei Xiao-Bao et al.; "Design of a Two-spindle CNC Machine Tool Applications for Dental Restoration"; Measuring Technology and Mechatronic Automation (ICMTMA), 2011 Third International Conference on, IEEE; Jan. 6, 2011; pp. 934-937 DOI: 10.1109/ICMTMA.2011.234.
Cao Hongrui et al.; "The concept and Progress of Intelligent Spindles: A Review"; International Journal of Machine Tools and Manufacture, Elsevier, Amsterdam, vol. 112; Oct. 17, 2016; pp. 21-52 DOI: 10.1016/J.IJMACHTOOLS.2016.10.005.
Sara Karam et al.; "Online Prediction of Cutting Tool Life in Turning via Cognitive Decision Making"; Procedia CIRP, vol. 41; Jun. 24, 2015; pp. 927-932 DOI: 10.1016/j.procir.2016.01.002.
Palanisamy et al.; "Prediction of tool wear using regression and ANN models in end-milling operation"; The International Journal of Advanced Manufacturing Technology, Springer, Berlin, DE; vol. 37, No. 1-2; Feb. 16, 2007; pp. 29-41.
Japanese Office Action dated Aug. 6, 2024.

* cited by examiner

DENTAL MACHINING SYSTEM FOR PREDICTING THE WEAR CONDITION OF A DENTAL TOOL

CROSS-REFERENCE TO RELATED APPLICATIONS

This is a National Phase application of International Application No. PCT/EP2020/079200, filed Oct. 16, 2020, which claims the benefit of and priority to European Application Ser. No. 19206733.8, filed on Nov. 1, 2019, which are herein incorporated by reference for all purposes.

TECHNICAL FIELD OF THE INVENTION

The present invention relates to a dental machining system and a method of controlling the same for manufacturing a dental restoration from a dental blank by using one or more dental tools. The present invention more particularly relates to a method of predicting the wear condition of the dental tool in the dental machining system.

BACKGROUND OF THE INVENTION

In general, a dental machining system has a dental tool machine for machining a dental blank which is typically made from ceramic. The dental tool machine generally has one or more driving units each movably holding at least one dental tool for machining a respective side of the dental blank. The dental tools are respectively mounted to tool motors in the driving units. The dental blank is mounted to a dental blank holder which is relatively movable with respect to the dental tools. Generally, a CAD/CAM software is used to digitally construct a dental restoration and to provide the corresponding machining data to the dental tool machine. The CAD/CAM software is usually run on a processing unit such as a PC in the dental machining system. A control unit controls the dental blank holder and the driving units based at least on a temporal trajectory of the dental tool relative to the dental blank and a spatial amount of material removal from the dental blank along the temporal trajectory.

The dental blank and the dental tool are consumables of the dental tool machine. The dental consumables which are available on the market vary in size, shape, and material. The dental tool machine must be equipped by the operator with the correct dental blank and the correct dental tool that match the specific requirements of the machining. When equipping the dental tool machine, the operator usually selects the correct dental consumables from a database via the user interface managed by the CAD/CAM software which partly serves as an auxiliary means for recognizing the consumables. Thereby, the information on the dental consumables equipped into the dental tool machine is also input to the dental tool machine, and thus recognized by the dental tool machine. Alternatively, each dental consumable is recognized by a reading means that reads the information tag of the dental consumable which also serves as an auxiliary means for recognizing the consumables. The information tag may be, for example, an RFID tag, a QR code, a bar code or the like. The reading means may be an RF transceiver or an optical transceiver, a camera or the like.

The machining can be conducted also with a dental tool that is not new but partly worn. In general, the wear condition of the dental tool is indicated with a percentage. For instance, 100% indicates that the dental tool is substantially new and 0% indicates a that the dental tool is completely worn, and thus its service life is over. When the dental tool machine is equipped with a new dental tool, the wear condition of the dental tool is usually predicted by the dental machining system after the machining is finished and managed in the database. Before start of the machining, the actual wear condition of the dental tool can be usually recognized through any of the above mentioned auxiliary means through reference to the database when equipping the dental tool machine. Different prediction methods are known. According to a commonly known prediction method, the wear condition of dental tools is predicted based on the number of machined dental restorations. However, this prediction method is very inaccurate because the restoration type and the restoration geometry may vary. Moreover, in this method the spatial load on the dental tools are not considered. According to another commonly known prediction method, the dental machining system is provided with a sensor for measuring the load on the dental tool during the machining. And the wear condition of dental tools is predicted based on the load on the dental tool after completion of the machining. However, the use of the load sensor increases the cost of the dental machining system.

The dental tool must be either new or have enough rest service life before start of the machining. Furthermore, the use of the dental tool must be timely terminated before it is completely worn. If the use of the dental tool is terminated early, unnecessary maintenance costs are incurred. If the use of the dental tool is terminated late, the product quality and safe operation of the dental tool can't be guaranteed. In the worst case, the dental tool may be overrun its total service life or its remaining service life. In such events, the dental tool can break, and the dental restoration can receive damages. In such cases, the dental tool machine, particularly the bearings can also receive damages. In less severe cases, the machining of the dental restoration is completed with an unacceptable, low quality due to the use of a highly worn dental tool. In all these cases, the user satisfaction may decrease.

Reference is made to Lei Xiao-Bao et al: "Design of a two-spindle CNC machine tool applications for dental restoration", Third international conference on measuring technology and mechatronics automation, 2011, Pages 934-937, ISBN 978-1-4244-9010-3.US2019/0258222A1 discloses optimal machining parameter selection using a data-driven tool life modelling approach.

Reference is made to Cao Hongrui et al: "The concept and progress of intelligent spindles: A review", International journal of machine tool and manufacture, 2017, Vol. 112, Pages 21-52, ISSN: 0890-6955.

Reference is made to Sara Karam et al, "Online prediction of cutting tool life in turning via cognitive decision making", 48th CIRP—Conference on manufacturing systems, 2016, Vol. 41, Pages 927-932, ISSN: 2212-8271.

Reference is made to P. Palanisamy et al: "Prediction of tool wear using regression and ANN models in end-milling operation", International journal of advanced manufacturing technology, 2008, Vol. 37, No: 1-2, Pages 29-41, ISSN: 1433-3015.

SUMMARY OF THE INVENTION

An objective of the present invention is to overcome the problems of the prior art and to provide a dental machining system and a control method of the same which can accurately predict, without using load sensors, the wear condition of a dental tool.

This objective has been achieved through the dental machining system as defined in claim 1, and the control method as defined in claim 10. The subject-matters of the other claims relate to further developments.

The present invention provides a dental machining system for manufacturing a dental restoration. The dental machining system comprises a dental tool machine which comprises: a dental blank holder for holding at least one dental blank relatively movable with respect to one or more dental tools; one or more driving units each for movably holding at least one dental tool for machining the dental blank; a control unit for controlling the dental blank holder and the driving units based at least on a temporal trajectory of the dental tool relative to the dental blank and a spatial amount of material removal from the dental blank along the temporal trajectory. The control unit executes a primary trained artificial intelligence algorithm to predict dynamical quantities based on the temporal trajectory and the spatial amount of material removal, wherein the dynamical quantities correspond to one or more physically measurable quantities which relate to the respective dental tool along the temporal trajectory. The control unit further executes a secondary trained artificial intelligence algorithm to predict the wear condition of the dental tool based on the predicted dynamical quantities.

A major advantageous effect of the present invention is that the dental machining system can accurately predict the wear condition of the dental tool through the primary and secondary trained artificial intelligence algorithms without using load sensors during the inference. Thereby, the customer can be provided with a dental tool machine which does not essentially need sensors for detecting the load of the dental tool for the wear prediction, and thus the cost performance ratio can be improved.

According to an embodiment of the present invention, the dental machining system is preferably further provided with a first auxiliary means for recognizing the type of the dental blank and the type of the dental tool, and a second auxiliary means for recognizing the actual wear condition of the dental tool before start of the machining. Thereby, the dental machining system can be more flexibly used with a variety of different dental blanks and dental tools that may be new or even partly worn. In this embodiment, the control unit executes the primary trained artificial intelligence algorithm to predict the dynamical quantities based on the temporal trajectory and the spatial amount of material removal, the type of the dental blank, the type of the dental tool, and the actual wear condition of the dental tool before starting the machining. And the control unit executes the secondary trained artificial intelligence algorithm to predict the wear condition of the dental tool based on the predicted dynamical quantities and the actual wear condition of the dental tool before starting the machining. Thereby, the prediction accuracy and the adaptiveness of the dental machining system has been further improved.

According to an embodiment of the present invention, in the dental machining system the control unit determines before starting of the machining whether the predicted wear condition of the dental tool will drop to a predetermined level before completion of the machining. The predetermined level may correspond to a completely worn dental tool.

Alternatively, the predetermined level may correspond to a partly worn dental tool that would secure a predetermined quality of the finished dental restoration. In this embodiment, the user is preferably informed before start of the machining when the remaining service life of the dental tool will not be enough for the completion of the machining process without exchanging the dental tool. Thereby, the risk of overrunning the predetermined level can be avoided, and thus the dental restoration can be prevented from quality losses or receiving any damages.

According to an embodiment of the present invention, the control unit determines a position along the temporal trajectory for interrupting the machining and to terminate use of the dental tool based on the predicted wear condition of the dental tool. Thereby, the user can be enabled to safely exchange the dental tool when such position is reached, and the machining can be securely interrupted. In this embodiment, the position along the temporal trajectory is preferably determined such that the machining process can be easily interrupted for allowing the user to exchange the dental tool. In this embodiment, the position along the temporal trajectory is preferably determined such that the wear condition of the dental tool is decreased to a predetermined level. Thereby, the use of the dental tool can be terminated at a predetermined level which would be optimal in view of cost, quality and speed. Thus, the service life of the dental tool can be optimally utilized, and the dental restoration can be finished with an optimal quality. In this embodiment, the predetermined level is preferably adjustable by the user via a user interface. Alternatively, the predetermined level may be determined by the dental tool machine in accordance with an optimization.

According to an embodiment of the present invention, the dental machining system uses a display for displaying a configuration field that allows the user to manually adjust one or more parameters of the forthcoming machining. The display is preferably a touch sensitive display. The parameters relate to the temporal trajectory and the spatial amount of material removal. Thereby, the user can configure the machining process in terms of cost, quality and time, namely through a process management triangle. In this embodiment, the control unit executes the secondary trained artificial intelligence algorithm to predict the wear condition of the dental tool at the end of the machining for the respective adjustment, and displays information indicating the predicted wear condition of the dental tool for the adjustment before start of the machining. The indication is preferably a percentage value between 100% and 0%, wherein 100% indicates that the dental tool is substantially new and 0% indicates a that the dental tool is completely worn. Alternatively, a color map or icons may be used. Thereby the displayed information can be used by the user as a decision-aid when adjusting the parameters. Thereby, for instance, the user is also enabled to know whether the remaining wear condition of the dental tool could be still enough for completing one or more further machining processes, and thus the user can plan ahead, and use the dental tools more efficiently.

According to an embodiment of the present invention, one or more parameters may be adjusted automatically without user adjustment. Therefore, in this embodiment, the control unit adjusts the parameters of the machining based on the predicted wear condition of the dental tool. The parameters relate, as before, to the temporal trajectory and the spatial amount of material removal. In this embodiment, for instance, a new dental tool can be moved through the material of the dental blank comparatively faster and/or with a smaller machining path distance. In contrast thereto, in this embodiment, a worn dental tool can be moved through the material of the dental blank slower and/or with a larger machining path distance. Thereby, the dental tool life, the dental restoration quality, and the process time for the machining can be optimized based on the wear prediction. In this embodiment, for instance, if the dental tool is already worn, then the control unit preferably seeks the possibility to adjust the parameters such that the dental tool can be used without the need of exchanging it before completion of the machining process provided that at least a sufficient quality can be secured for the finished dental restoration. Thereby, the dental tool can be utilized gently without compromises on quality but with least expense of prolonging the machining. Thereby, the dental tool can be utilized more efficiently.

According to an embodiment of the present invention, the dental machining system has a training mode and an inference mode. In the inference mode, the wear condition of the dental tool is predicted based on the primary and secondary trained artificial intelligence algorithms without using sensors for detecting the load. Therefore, the inference mode can be conducted on a dental machining system without using sensors for detecting the load. The training mode is conducted on a dental machining system which further comprises: one or more sensors for measuring the dynamical quantities which relate to one or more dental tools when driven along the temporal trajectory with the spatial amount of material removal from the dental blank. In the training mode, the control unit is further adapted to train the primary artificial intelligence algorithm for predicting the dynamical quantities based on the temporal trajectory, the spatial amount of material removal, and the measured dynamical quantities. An evaluation criteria comprises a similarity metric between the predicted dynamical quantities and the measured dynamical quantities. In the training mode, the control unit is further adapted to train the secondary artificial intelligence algorithm for predicting the wear condition of the dental tool based on the predicted dynamical quantities and the actual wear condition of the dental tool. An evaluation criteria comprises a similarity metric between the predicted wear condition and the actual wear condition of the dental tool. Alternatively, the secondary artificial intelligence algorithm can be trained on a dental machining system which has no sensors for detecting dynamical quantities i.e., load and the like.

According to an embodiment of the present invention, the dental machining system is further provided with a first auxiliary means for recognizing the type of the dental blank and the type of the dental tool, and a second auxiliary means for recognizing the actual wear condition of the dental tool before start of the machining. In this embodiment, the control unit is further adapted to train the primary trained artificial intelligence algorithm for further predicting the dynamical quantities based on the temporal trajectory, the spatial amount of material removal, the measured dynamical quantities, the type of the dental blank, the type of the dental tool, and the actual wear condition of the dental tool. Thereby, the primary and secondary trained artificial intelligence algorithms can be improved with respect to the prediction accuracy and the adaptiveness to the variety of dental blanks and dental tools on the market. Of course, the dental machining systems may also be operated with a default dental blank, a default dental tool, and always required to be initially equipped with a new, unused dental tool.

According to an embodiment of the present invention, the dynamical quantities correspond to at least the speed, the acceleration, the vibration of the respective dental tool, or the force, the torque acting on the respective dental tool or the supply current to a dental tool motor of the respective dental tool or the sound generated by the respective dental tool. The sensors used may be a speed sensor, an acceleration sensor, a vibration sensor, a force sensor, a torque sensor, a supply current sensor, or an acoustic sensor.

According to an embodiment of the present invention, the dental machining system may also have a CAD/CAM module which preferably includes a computer station that runs a CAD/CAM software. The primary and secondary artificial intelligence algorithms are preferably provided as part of the CAD/CAM module. The CAD/CAM module is preferably external to the dental tool machine and accessible through a network or the like. A plurality of different dental tool machines may use the same primary and secondary trained artificial intelligence algorithms for the inference. The CAD/CAM module may be also provided as part of the dental tool machine. The present invention also provides a CAD/CAM software for implementing the above mentioned functions of the dental machining system. The CAD/CAM software has computer-readable codes for causing a computerized dental machining system to execute the functions. The CAD/CAM software is stored in computer-readable storage medium. The storage medium may be portable or integrated. The storage medium may be located external or internal to the dental machining system. The storage medium may be reachable through a network or the like. The present invention can be applied to dental tool machines with various types of kinematics for moving the dental blank and the dental tools.

DETAILED DESCRIPTION OF THE INVENTION

Figure 2:
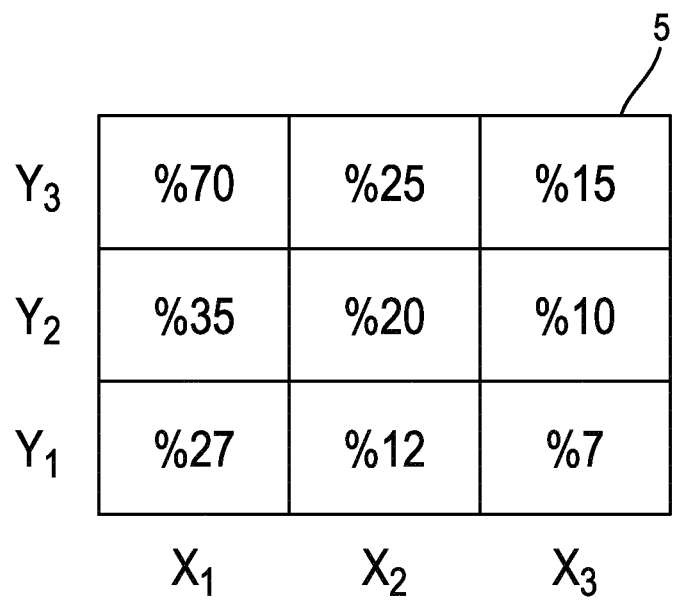

In the subsequent description, further aspects and advantageous effects of the present invention will be described in more detail by using exemplary embodiments and by reference to the drawings, wherein FIG. 1—is a perspective schematic view of a dental tool machine of a dental machining system according to an embodiment of the present invention;

FIG. 2—is a schematic view of a display of a configuration field for adjusting a forthcoming machining according to an embodiment of the present invention.

The reference numbers shown in the drawings denote the elements as listed below and will be referred to in the subsequent description of the exemplary embodiments:

1. Dental tool machine
2. Dental blank
   2a. Shaft
3. Dental tool
4. Driving unit
   4a. Arm
   4b. Shaft
5. Configuration field
X1, X2, X3, Y1, Y2, Y3: Parameters for machining FIG. 1 partly shows a dental tool machine (1) of a dental machining system for manufacturing a dental restoration. The dental tool machine (1) comprises: a dental blank holder which holds a dental blank (2) relatively movable with respect to the dental tools (3); two driving units (4) each movably holding a dental tool (3) for machining the dental blank (2); and a control unit adapted to control the dental blank holder and the driving units (4) based at least on a temporal trajectory of the dental tool (3) relative to the dental blank (2) and a spatial amount of material removal from the dental blank (2) along the temporal trajectory. Each driving unit (4) has a shaft (4b). An arm (4a) is radially fixed to each shaft (4b). Each driving unit (4) has a driving mechanism which can rotate the shaft (4b) about the z axis and reciprocate the shaft (4b) along the z axis. The dental tools (3) are held by tool motors which are located in the arms (4a) respectively. The dental blank (2) is joined to a shaft (2a). The shaft (2a) is connected to another driving mechanism which can rotate the shaft (2a) about the y axis and reciprocate the shaft (2a) along the y axis.

The control unit has a training mode and an inference mode. In the subsequent description first the inference mode will be described. The training mode will be described later. In the inference mode the control unit is adapted to execute a primary trained artificial intelligence algorithm adapted to predict dynamical quantities based on the temporal trajectory and, the spatial amount of material removal. The dynamical quantities correspond to one or more physically measurable quantities which relate to the respective dental tool (3) along the temporal trajectory. In the inference mode the control unit is also adapted to execute a secondary trained artificial intelligence algorithm adapted to predict the wear condition of the dental tool (3) based on the predicted dynamical quantities.

In an embodiment, the dynamical quantity corresponds at least to the speed, the acceleration, the vibration of the respective dental tool (3), or the force, the torque acting on the respective dental tool (3) or the supply current to a dental tool motor of the respective dental tool (3) or the sound generated by the respective dental tool (3). Herein, the speed, acceleration and the force may be measured along any of the x, y, z directions corresponding to the degrees of freedom of the dental tool machine (1). The speed may also comprise the speed of revolution of the dental tool (3).

In an embodiment, the wear condition of the dental tool (3) is predicted as a percentage. 100% indicates that the dental tool (3) is substantially new and 0% indicates a that the dental tool (3) is completely worn.

In an embodiment, the dental machining system further comprises: a first auxiliary means for recognizing the type of the dental blank (2) and the type of the dental tool (3); and a second auxiliary means for recognizing the actual wear condition of the dental tool (3). In this embodiment, the control unit is further adapted to execute the primary trained artificial intelligence algorithm which is further adapted to predict the dynamical quantities based on the temporal trajectory and the spatial amount of material removal, the type of the dental blank (2), the type of the dental tool (3), and the actual wear condition of the dental tool (3) before starting the machining. In this embodiment, the control unit is further adapted to execute the secondary trained artificial intelligence algorithm which is further adapted to predict the wear condition of the dental tool (3) based on the predicted dynamical quantities, and the actual wear condition of the dental tool (3) before starting the machining. The first auxiliary means and the second auxiliary means are optional, since the dental tool machine can also be operated with a default type of dental blank (2), a default type of dental tool (3), wherein the dental tool machine (1) is equipped initially with a new dental tool (3).

In an embodiment, the control unit determines before starting of the machining whether the predicted wear condition of the dental tool (3) will drop to a predetermined level before completion of the machining.

In an embodiment, the control unit determines a position along the temporal trajectory for interrupting the machining and to terminate use of the dental tool (3) based on the predicted wear condition of the dental tool (3).

In an embodiment, the dental machining system further comprises a display for displaying a configuration field (5) for allowing the user to manually adjust one or more parameters (X1-X3,Y1-Y3) of the forthcoming machining.

The user may opt for manual adjustment through the user interface. FIG. 2 shows a configuration field (5) which is displayed on a display of the user interface of the dental tool machine (1). The parameters (X1-X3,Y1-Y3) relate to the temporal trajectory and the spatial amount of material removal. The parameters (X1-X3,Y1-Y3) shown in FIG. 2 are discrete so that the adjustment can be conducted by selecting the parameters (X1-X3,Y1-Y3). They may be alternatively continuously adjusted, for instance, through a software slider. As shown in FIG. 2, when the user selects a set of parameters (X1,Y1), then the configuration field (5) correspondingly shows the predicted wear condition of the dental tool (3), i.e., 27% that will be attained at the end of the machining conducted with such selected parameters (X1,Y1). The number of parameters, their ranges etc., may be defined according to the application. They may include quality levels, speed levels and the like. In this embodiment, the control unit executes the first and secondary trained artificial intelligence algorithms so as to predict before start of the machining the wear condition of the dental tool (3) to be attained at the end of the machining for the respective adjustment and displays, on the display, information indicating the predicted wear condition of the dental tool (3) for the adjustment before start of the machining. The configuration field (5) is illustrated in form of a 3×3 matrix. Alternatively, it may be a continuous color map, wherein the colors indicate the wear condition of the dental tool (3).

The user may alternatively opt for automatic adjustment through the user interface. In an embodiment, the control unit automatically adjusts the parameters (X1-X3,Y1-Y3) of the machining based on the predicted wear condition of the dental tool (3).

In the subsequent description the training mode will be described. The training mode is conducted on a dental machining system which comprises one or more sensors for the measuring the dynamical quantities which relate one or more dental tools (4) when driven along the temporal trajectory with the spatial amount of material removal from the dental blank (2). In the training mode the control unit trains the primary artificial intelligence algorithm for predicting the dynamical quantities based on the temporal trajectory, the spatial amount of material removal, and the measured dynamical quantities. In the training mode the control unit trains the secondary artificial intelligence algorithm for predicting the wear condition of the dental tool (3) based on the predicted dynamical quantities and the actual wear condition of the dental tool (3). The secondary artificial intelligence algorithm may be alternatively trained on a dental machining system which doesn't have the sensors for the measuring the dynamical quantities. The dental tool machine (1) used for training the primary artificial intelligence algorithm has the same kinematics with the dental tool machine (1) used for training the secondary artificial intelligence algorithm. The inference mode can be run on a dental machining system which does not comprise the sensors for the measuring the dynamical quantities.

In an embodiment, the control unit trains the primary trained artificial intelligence algorithm for further predicting the dynamical quantities based on the temporal trajectory, the spatial amount of material removal, the measured dynamical quantities, the type of the dental blank (2), the type of the dental tool (3), and the actual wear condition of the dental tool (3). In this embodiment, the dental machining system has a first auxiliary means and the second auxiliary means as described above.

The invention claimed is:

1. A dental machining system for manufacturing a dental restoration comprising:
a dental tool machine which comprises:
a dental blank holder configured to hold at least one dental blank relatively movably with respect to one or more dental tools;
one or more driving units each configured to movably hold at least one dental tool for machining the dental blank;
a control unit configured to control the dental blank holder and the driving units based at least on a temporal trajectory of the dental tool relative to the dental blank and a spatial amount of material removal from the dental blank along the temporal trajectory,
wherein the control unit is further configured to execute a primary trained artificial intelligence algorithm adapted to predict dynamical quantities based on the temporal trajectory and the spatial amount of material removal, wherein the dynamical quantities correspond to one or more physically measurable quantities which relate to the respective dental tool along the temporal trajectory,
wherein the dynamical quantities corresponds to at least one quantity selected from the list consisting of a speed, an acceleration, a vibration of the respective dental tool, a force or a torque acting on the respective dental tool, a supply current to a dental tool motor of the respective dental tool and a sound generated by the respective dental tool,
wherein the primary trained artificial intelligence algorithm is a trained artificial intelligence algorithm that is trained using the temporal trajectory and the spatial amount of material removal and the measured dynamical quantities and wherein an evaluation criteria comprises a similarity metric between the predicted dynamical quantities and the measured dynamical quantities;
wherein the control unit is further configured to execute a secondary trained artificial intelligence algorithm adapted to predict a wear condition of the dental tool based on the predicted dynamical quantities,
wherein the secondary trained artificial intelligence algorithm is a trained artificial intelligence algorithm that is trained using the predicted dynamical quantities and an actual wear condition of the dental tool and wherein an evaluation criteria comprises a similarity metric between a predicted wear condition and the actual wear condition of the dental tool,
wherein the control unit is further adapted to control the dental blank holder and the driving units based on the prediction.

2. The dental machining system according to claim 1, further comprising:
a first auxiliary means configured to recognize a type of the dental blank and the type of the dental tool;
a second auxiliary means configured to recognize the actual wear condition of the dental tool;
wherein the control unit is further configured to execute the primary trained artificial intelligence algorithm further adapted to predict the dynamical quantities based on the temporal trajectory and the spatial amount of material removal, the type of the dental blank, the type of the dental tool, and the actual wear condition of the dental tool before starting the machining; and
wherein the secondary trained artificial intelligence algorithm is further configured to predict the wear condition of the dental tool based on the predicted dynamical quantities and the actual wear condition of the dental tool before starting the machining.

3. The dental machining system according to claim 1, wherein the control unit is further configured to determine before starting of the machining whether the predicted wear condition of the dental tool will drop to a predetermined level before completion of the machining,
wherein the control unit is further adapted to control the dental blank holder and the driving units based on the determination.

4. The dental machining system according to claim 1, characterized in that the control unit is further adapted to determine a position along the temporal trajectory for interrupting the machining and to terminate use of the dental tool based on the predicted wear condition of the dental tool.

5. The dental machining system according claim 1, further comprising:
a display configured to display a configuration field to allow a user to adjust one or more parameters of a forthcoming machining, wherein the parameters relate to the temporal trajectory and the spatial amount of material removal;
wherein the control unit is further adapted to execute the first and secondary trained artificial intelligence algorithms so as to predict before starting the machining the wear condition of the dental tool at the end of the machining for the respective adjustment, and to display on the display information indicating the predicted wear condition of the dental tool for the adjustment before start of the machining, and to control the dental blank holder and the driving units based on the user adjustment.

6. The dental machining system according to claim 1, wherein the control unit is configured to adjust parameters of the machining based on the predicted wear condition of the dental tool, wherein the parameters relate to the temporal trajectory and the spatial amount of material removal.

7. The dental machining system according to claim 1 further comprising:
one or more sensors configured to measure the dynamical quantities which relate to one or more dental tools when driven along the temporal trajectory with the spatial amount of material removal from the dental blank;
wherein the control unit is further adapted to train the primary artificial intelligence algorithm to predict the dynamical quantities based on the temporal trajectory, the spatial amount of material removal, and the measured dynamical quantities, and to train the secondary artificial intelligence algorithm to predict the wear condition of the dental tool based on the predicted dynamical quantities and the actual wear condition of the dental tool.

8. The dental machining system according to claim 7, wherein the control unit is further configured to train the primary trained artificial intelligence algorithm to further predict the dynamical quantities based on the temporal trajectory, the spatial amount of material removal, the measured dynamical quantities, the type of the dental blank, the type of the dental tool, and the actual wear condition of the dental tool.

9. The dental machining system according to claim 1, wherein the wear condition of the dental tool is predicted as a percentage, wherein 100% indicates that the dental tool is substantially new and 0% indicates a that the dental tool is completely worn.

10. A method of controlling a dental machining system of claim 1, to manufacture a dental restoration, the method comprising:
- causing the control unit to execute the primary trained artificial intelligence algorithm adapted to predict dynamical quantities based on the temporal trajectory and the spatial amount of material removal, wherein the dynamical quantities correspond to one or more physically measurable quantities which relate to the respective dental tool along the temporal trajectory, and
- causing the control unit to execute a secondary trained artificial intelligence algorithm adapted to predict the wear condition of the dental tool based on the predicted dynamical quantities.

11. A non-transitory computer readable storage medium comprising storing a program which, when executed by a computer system, causes the computer system to perform a procedure comprising the steps of claim 10.

12. A method comprising:
- providing a dental tool machine comprising a dental blank holder configured to hold at least one dental blank relatively movably with respect to one or more dental tools and one or more driving units each configured to movably hold at least one dental tool for machining the dental blank;
- controlling, by the control unit, the dental blank holder and the one or more driving units based at least on a temporal trajectory of the dental tool relative to the dental blank and a spatial amount of material removal from the dental blank along the temporal trajectory,
- executing, by the control unit, a primary trained artificial intelligence algorithm to predict dynamical quantities based on the temporal trajectory and a spatial amount of material removal, the dynamical quantities corresponding to one or more physically measurable quantities which relate to the respective dental tool along the temporal trajectory, and
- executing, by the control unit, a secondary trained artificial intelligence algorithm to predict a wear condition of the dental tool based on the predicted dynamical quantities,
- wherein the dynamical quantity corresponds to at least one quantity selected from the list consisting of a speed, an acceleration, a vibration of the respective dental tool, a force or a torque acting on the respective dental tool, a supply current to a dental tool motor of the respective dental tool and a sound generated by the respective dental tool,
- wherein the primary trained artificial intelligence algorithm is a trained artificial intelligence algorithm that is trained using the temporal trajectory and the spatial amount of material removal and the measured dynamical quantities and wherein a corresponding evaluation criteria comprises a similarity metric between the predicted dynamical quantities and the measured dynamical quantities;
- wherein the secondary trained artificial intelligence algorithm is a trained artificial intelligence algorithm that is trained using the predicted dynamical quantities and the actual wear condition of the dental tool and wherein another corresponding evaluation criteria comprises a similarity metric between the predicted wear condition and the actual wear condition of the dental tool.

13. The method of claim 12 further comprising:
- causing the control unit to control the dental blank holder and the driving units based on the prediction.

14. A non-transitory computer-readable storage medium storing a program which, when executed by a computer system, causes the computer system to perform a procedure comprising the steps of:
- controlling, by the control unit, a dental blank holder holding at least one dental blank and one or more driving units of a dental tool machine based at least on a temporal trajectory of at least one dental tool relative to dental blank and a spatial amount of material removal from the dental blank along the temporal trajectory,
- executing, by the control unit, a primary trained artificial intelligence algorithm to predict dynamical quantities based on the temporal trajectory and a spatial amount of material removal, the dynamical quantities corresponding to one or more physically measurable quantities which relate to the respective dental tool along the temporal trajectory, and
- executing, by the control unit, a secondary trained artificial intelligence algorithm to predict a wear condition of the dental tool based on the predicted dynamical quantities,
- wherein the dynamical quantity corresponds to at least one quantity selected from the list consisting of a speed, an acceleration, a vibration of the respective dental tool, a force or a torque acting on the respective dental tool, a supply current to a dental tool motor of the respective dental tool and a sound generated by the respective dental tool,
- wherein the primary trained artificial intelligence algorithm is a trained artificial intelligence algorithm that is trained using the temporal trajectory and the spatial amount of material removal and the measured dynamical quantities and wherein a corresponding evaluation criteria comprises a similarity metric between the predicted dynamical quantities and the measured dynamical quantities;
- wherein the secondary trained artificial intelligence algorithm is a trained artificial intelligence algorithm that is trained using the predicted dynamical quantities and the actual wear condition of the dental tool and wherein another corresponding evaluation criteria comprises a similarity metric between the predicted wear condition and the actual wear condition of the dental tool.

\* \* \* \* \*